United States Patent
Decker

(10) Patent No.: US 9,440,523 B2
(45) Date of Patent: Sep. 13, 2016

(54) UNDERFLOOR UNIT FOR A MOTOR VEHICLE

(71) Applicant: Dr. Ing. h.c. F. Porsche Aktiengesellschaft, Stuttgart (DE)

(72) Inventor: Salvatore Decker, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/705,105

(22) Filed: May 6, 2015

(65) Prior Publication Data

US 2015/0336452 A1   Nov. 26, 2015

(30) Foreign Application Priority Data

May 26, 2014   (DE) .......... 10 2014 107 388

(51) Int. Cl.
   *B60K 1/04*       (2006.01)
   *H01M 2/10*       (2006.01)
   *H01M 10/613*     (2014.01)
   *H01M 10/625*     (2014.01)
   *H01M 10/6556*    (2014.01)
   *H01M 2/02*       (2006.01)
   (Continued)

(52) U.S. Cl.
   CPC .......... *B60K 1/04* (2013.01); *B62D 25/20* (2013.01); *H01M 2/0237* (2013.01); *H01M 2/1083* (2013.01); *H01M 10/613* (2015.04); *H01M 10/625* (2015.04); *H01M 10/6556* (2015.04); *B60K 2001/005* (2013.01); *B60K 2001/0438* (2013.01); *H01M 2220/20* (2013.01)

(58) Field of Classification Search
   CPC .......................... B60K 1/04; B60K 6/40
   USPC .......................................... 180/68.5
   See application file for complete search history.

(56) References Cited

U.S. PATENT DOCUMENTS 384,576 A  *  6/1888  Hunter ............ B60L 11/1822
                                                105/456
3,837,918 A  *  9/1974  Nakabayashi .... H01M 10/3909
                                                429/104
(Continued)

FOREIGN PATENT DOCUMENTS

DE   10 2009 058 809    6/2011
DE   10 2010 024 320   12/2011
(Continued)

OTHER PUBLICATIONS

German Search Report of Dec. 10, 2014.

*Primary Examiner* — Hau Phan
(74) *Attorney, Agent, or Firm* — Gerald E. Hespos; Michael J. Porco; Matthew T. Hespos

(57) ABSTRACT

An underfloor unit for reinforcing a motor vehicle body has a base body (12) connected to the motor vehicle body and intended to dissipate static and/or dynamic loads of the motor vehicle body. The base body (12) has an upwardly directed support plate (14) for supporting battery cell units of a traction battery for and a downwardly directed separate armor plate (16) for protecting the battery cell units against sudden effects of force from below. A cooling duct (18) for cooling the battery cell units is formed between the support plate (14) and the armor plate (16). The underfloor unit (10) can support the battery cells of the traction battery as a support plate (14), protect them as armor and cool them with the aid of the cooling duct (18) as a heat exchanger.

10 Claims, 1 Drawing Sheet

(51) Int. Cl.
  *B62D 25/20* (2006.01)
  *B60K 1/00* (2006.01)

(56) References Cited

U.S. PATENT DOCUMENTS

| | | | | |
|---|---|---|---|---|
| 5,392,873 A * | 2/1995 | Masuyama | ............. | B60R 16/04 180/68.5 |
| 5,501,289 A * | 3/1996 | Nishikawa | ............... | B60K 1/04 180/65.1 |
| 5,620,057 A * | 4/1997 | Klemen | ................... | B60K 1/04 180/65.1 |
| 5,639,571 A * | 6/1997 | Waters | ................ | B60L 11/1874 180/68.5 |
| 5,833,023 A * | 11/1998 | Shimizu | ................. | B62D 21/00 180/68.5 |
| 6,040,080 A * | 3/2000 | Minami | ................... | B60K 1/04 429/100 |
| 6,085,854 A * | 7/2000 | Nishikawa | ............... | B60K 1/04 180/68.5 |
| 6,372,378 B1 * | 4/2002 | Warner | ............... | H01M 2/1077 429/100 |
| 6,632,560 B1 * | 10/2003 | Zhou | ................... | H01M 2/1083 180/68.5 |
| 7,218,489 B2 * | 5/2007 | Wilk | ...................... | H01G 9/008 361/42 |
| 8,281,884 B2 * | 10/2012 | Cimatti | .................... | B60K 6/40 165/42 |
| 8,397,853 B2 * | 3/2013 | Stefani | ................... | B62D 25/20 180/65.31 |
| 8,939,246 B2 * | 1/2015 | Yamaguchi | .............. | B60K 1/04 180/311 |
| 8,960,781 B2 * | 2/2015 | Rawlinson | ........... | B60J 10/0031 180/68.5 |
| 9,227,582 B2 | 1/2016 | Katayama et al. | | |
| 2009/0242299 A1 * | 10/2009 | Takasaki | .................. | B60K 1/04 180/68.5 |
| 2010/0314905 A1 * | 12/2010 | Mori | ................... | B62D 29/002 296/187.03 |
| 2012/0312614 A1 | 12/2012 | Fujiwara et al. | | |
| 2013/0189558 A1 | 7/2013 | Haussmann | | |
| 2014/0315064 A1 | 10/2014 | Katayama et al. | | |

FOREIGN PATENT DOCUMENTS

| | | |
|---|---|---|
| DE | 10 2010 032 898 | 2/2012 |
| DE | 10 2011 114 772 | 4/2013 |
| WO | 2013/051638 | 4/2013 |

\* cited by examiner

UNDERFLOOR UNIT FOR A MOTOR VEHICLE

CROSS REFERENCE TO RELATED APPLICATION

This application claims priority under 35 USC 119 to German Patent Appl. No. 10 2014 107 388.6 filed on May 26, 2014, the entire disclosure of which is incorporated herein by reference.

BACKGROUND

1. Field of the Invention

The invention relates to an underfloor unit for a motor vehicle, with the aid of which a motor vehicle body of a motor vehicle can be reinforced.

2. Description of the Related Art

A motor vehicle body of a motor vehicle can have a supporting support structure in which solidly designed longitudinal members and solidly designed crossmembers are connected to one another to form a supporting frame that forms a stable platform to which the remaining components of the motor vehicle can be connected. The support structure can support a drive, the individual body parts, functional units of the motor vehicle and a useful load and can dissipate their weight forces to the ground. A plate-shaped underfloor unit can be connected to the support structure to reinforce the support structure and the motor vehicle body. The underfloor also covers and protects structural units arranged above the underfloor unit with respect to the ground.

WO 2013/051638 A1 discloses a battery housing of a traction battery that is connected to an underfloor of a motor vehicle from below. An underside of the battery housing that is directed toward the ground is designed as a thin-walled aluminum casting with outwardly projecting cooling fins.

DE 10 2010 024 320 A1 discloses a support plate of a battery housing that is screwed to a support structure of a motor vehicle body from below. The support plate is provided with cooling ducts and is designed with sufficient stiffness to dissipate the weight forces of a traction battery to the support structure. The support plate is provided on its underside with a deformable energy-absorption layer that can be deformed plastically in the event of an accident ("crash") to protect the traction battery from damage.

There is a constant requirement for a long service life of a traction battery of a motor vehicle. Accordingly, it is an object of the invention to provide a longer service life for a traction battery of a motor vehicle.

SUMMARY OF THE INVENTION

The invention relates to an underfloor unit for reinforcing a motor vehicle body, particularly between a front axle and a rear axle of a motor vehicle. The underfloor unit comprises a base body that can be connected to the motor vehicle body for dissipating static and/or dynamic loads of the motor vehicle body. The base body has an upwardly directed support plate for supporting battery cell units that form a traction battery for the purely electric drive of the motor vehicle. The base body also has a downwardly directed separate armor plate for protecting the battery cell units against sudden effects of force from below. A cooling duct is formed between the support plate and the armor plate for cooling the battery cell units.

The underfloor unit reinforces the motor vehicle body. Thus, the base body is designed solidly to dissipate the loads expected while operating the motor vehicle and in the event of a collision. As a result, the base body is stable enough to support the heavy battery cell units of the traction battery and to function as armor for the battery cell units. The battery cell units are protected securely against damage by the ground, for example in the event of a bottoming of the motor vehicle on an obstacle projecting up from the ground. At the same time, the at least two-part design of the base body makes it possible for the at least one cooling duct to be provided in the base body without significantly weakening the base body. As a result, the base body can actively and/or passively cool the battery cell units to avoid overheating of and damage to the battery cell units by non-dissipated heat. Consequently, the base body performs plural functions at the same time. The battery cell units are arranged above the underfloor unit in a lower region of the motor vehicle. Thus, the underfloor unit is part of an armored battery housing and, due to the solid design, can also be used as a load-bearing base and heat exchanger. The solid design of base body enables the underfloor unit to support the battery cells of the traction battery as a support plate of a battery housing, to protect the battery cells as armor and to cool the battery cells actively and/or passively with the aid of the cooling duct as a heat exchanger. Therefore, a long service life of a traction battery of the motor vehicle provided in a lower region of the motor vehicle.

The support plate can be designed to dissipate the weight forces of the traction battery and to reinforce a support structure of the motor vehicle body. For this purpose, the support plate can be correspondingly thick and stiff. It is also possible for both the support plate and the armor plate to contribute to reinforcing the motor vehicle body. As a result, the support plate and the armor plate together dissipate forces and each can be correspondingly thinner. The support plate and/or the armor plate may be produced from aluminum, such as an aluminum casting. The cooling duct can be closed completely to the top by the support plate. As a result, the cooling duct is sealed by the support plate with respect to the battery cell units. Cooling medium channeled through the cooling duct cannot contact the battery cell units is avoided to prevent an electrical short circuit via the cooling medium.

An upper side of the support plate that is directed toward the battery cell units can be a flat plane and may have connection means for connecting to a battery housing. Furthermore, the upper side can be structured and formed three-dimensionally to specify a defined arrangement and placing of the battery cell units relative to the base body. For this purpose, the upper side can form, for example, positioning marks and/or positive bearing surfaces for orienting and positioning the battery cell units.

The base body can extend in the transverse direction of the motor vehicle between the maximum far-right and maximum far-left longitudinal members of a support structure of the motor vehicle body. If a spacing between the center lines of the right and left longitudinal members is D, the extent d of the base body in the transverse direction may be: $1.10 \leq d/D \leq 0.80$, preferably $1.00 \leq d/D \leq 0.90$ and most preferably $0.98 \leq d/D \leq 0.95$. All of the battery cell units of the traction battery may be arranged between the left and right longitudinal members. As viewed in the transverse direction, the left and right longitudinal members may cover at least a part of the battery cell units. Thus, the right and left longitudinal members function as armor for the battery cell units in the event of a side-on crash of the motor vehicle. The base body can extend in the longitudinal direction of the motor vehicle between the front axle and the rear axle of the motor vehicle. If a wheel base A between the front axle and the rear axle is A, the extent "a" of the base body in the longitudinal direction may be $1.10 \leq a/A \leq 0.30$, preferably $1.00 \leq a/A \leq 0.40$, more preferably $0.90 \leq a/A \leq 0.50$ and particularly preferably $0.80 \leq a/A \leq 0.60$.

A first connection for feeding a cooling medium for cooling the support plate and a second connection for removing the cooling medium can be connected to the at least one cooling duct. The cooling medium can be channeled through the underfloor unit from a source that lies outside the underfloor unit via the first connection and the second connection to control the temperature of, in particular cool or heat, the battery cell units. The cooling medium used can be a liquid, for example cooling water, cooling oil or a refrigerant. The first and second connections can be connected to hose lines of a cooling system. A cooled cooling medium can be introduced into the underfloor unit via the first connection. The cooled cooling medium is heated within the cooling duct and, in the heated state, leaves the underfloor unit via the second connection. The second connection can be connected outside the underfloor unit to the first connection via a cooler and a pump. Thus, a cooling circuit is formed. It is also possible for the second connection to be connected to a heat exchanger of a chiller to remove heat from the cooling medium. The cooled cooling medium can be fed to the underfloor unit via a further first connection and pass via a further second connection to a pump that pumps the cooling medium via the first connection into the underfloor unit with the aid of a condenser and of an expansion valve. Thus, the chiller can feed a refrigerant with a correspondingly low temperature to the heat exchanger, where the refrigerant can be evaporated by the cooling medium coming from the underfloor unit to remove heat from the cooling medium. The refrigerant can be circulated with the aid of a compressor.

The base body can be an evaporator for evaporating the cooling medium. As a result of the phase change of the coolant, in the form of a refrigerant, a correspondingly high cooling capacity can be achieved within the underfloor unit in the cooling duct. Furthermore, the cooling system connected via the connections can be simplified. In particular, a common cooling medium can be used for the underfloor unit and the cooling system. As a result, a heat exchange between the cooling medium used for the floor unit and a refrigerant used for the cooling system is not required and a single conveying unit, such as a compressor or pump, is sufficient for the cyclic process of the cooling system.

The cooling duct may be formed by the material of the armor plate, in particular by a cutting process. Cutting, in particular milling, of the armor plate can easily produce an individual profile of the cooling duct with a plurality of windings and deflection regions. The cooling duct can be incorporated in the armor plate as a channel that is open on one side, and the support plate can close the open side with a substantially planar underside. The flow cross section of the cooling duct can be delimited by the armor plate and the support plate. The cooling duct can be formed simply by arranging the support plate and the armor plate above one another, with the result that the production and assembly of the cooling duct are simplified and cost-effective.

The cooling duct may formed by a shaped sheet connected to the support plate and the armor plate. The armor plate can be spaced from the support plate over the extent of the shaped sheet. The shaped sheet can be produced from a metal sheet, such as aluminum or stainless steel formed without cutting. The shaped sheet may be connected directly to the support plate and the armor plate, such as by welding. The shaping of the shaped sheet makes it possible for an individual structure of the cooling duct with a plurality of windings and deflection regions to be formed simply and cost-effectively. The armor plate may be connected only to the shaped sheet, and the shaped sheet may be sufficiently stable to dissipate the weight force of the armor plate to the support plate. Alternatively, the armor plate also can be connected to the support plate. The shaped sheet also can perform the function of a crashbox and, in the event of a correspondingly high effect of force on the armor plate, can be deformed plastically by the armor plate to absorb impact energy caused by the plastic deformation and to protect the battery cell units from damage.

The shaped sheet forms an upper contact surface for planar contact with the support plate and a lower contact surface for planar contact with the armor plate. As a result, a planar underside of the support plate and a planar upper side of the armor plate can be placed flat against the shaped sheet, thereby enabling a secure connection of the support plate and/or the armor plate to the shaped sheet by brazing or adhesive bonding. An adhesive can be applied in a simple manner by spray application or roll application onto the upper contact surface and/or the lower contact surface.

The shaped sheet may form the cooling duct between the support plate and the shaped sheet and/or between the shaped sheet and the armor plate. The support plate and/or the armor plate can delimit the flow cross section of the respective cooling duct. In particular, the shaped sheet can form a cavity between the support plate and the shaped sheet and also between the shaped sheet and the armor plate. The cavity can be used as a cooling duct through which a cooling medium can flow for removing heat from the battery cell units. As a result, a large part of the volume between the support plate and the armor plate can be used for cooling, or for temperature control of the battery cell units. For example, the cooling duct between the support plate and the shaped sheet can be used to cool the battery cell units, and the cooling duct between the shaped sheet and the armor plate can be used for heating the battery cell units. A first cooling media having a first temperature can flow through the cooling duct formed between the support plate and the shaped sheet, and a second cooling media having a second temperature can flow through the cooling duct formed between the shaped sheet and the armor plate.

The support plate can form a duct wall of the cooling duct. As a result, good heat transfer from the battery cell units to the cooling medium in the cooling duct is achieved via the support plate.

The support plate may be connected by welding, in particular friction welding, to a material delimiting the cooling duct. Thus, the support plate can be connected in a particularly secure and sealed manner to the armor plate or to the shaped sheet, As a result, a sealed cooling duct and good heat transfer from the support plate to the material delimiting the cooling duct can be achieved in a cost-effective manner.

The base body may be composed of different materials in a sandwich structure. In particular the support plate may comprise a metal material, such as aluminum, and the armor plate may comprise a fiber-reinforced composite material. The metal material of the support plate allows good heat transport from the battery cell units to the cooling medium in the cooling duct. An armor plate produced from a fiber composite material, for example a carbon-fiber-reinforced plastic (CFP) or a glass-fiber-reinforced plastic (GFP), can be deformed elastically to a relatively large extent, thereby avoiding plastic deformations of the underfloor unit. Furthermore, the fiber-reinforced plastic can dissipate particularly high tensile forces.

The support plate may have left and right fastening flanges for fastening respectively to the left and right longitudinal members of a support structure of the motor vehicle body. As a result, the underfloor unit can be connected directly to the support structure of the motor vehicle body and can dissipate static and/or dynamic loads via the material of the base body. A frame-shaped intermediate housing and/or cover of a battery housing can be connected to the base body in the vertical extension of outer sidewalls of the support plate of the base body. Additionally or alternatively, parts of the battery housing can be connected to the respective fastening flange. Thus, there is no need for fastening means in the side walls, and an upper side of the side walls can be used to seal the battery housing. Further, the fastening flange may project substantially horizontally, and can act as a cooling fin to dissipate heat of the battery cell units that is absorbed by the base body convectively and/or by thermal conduction to the longitudinal members.

Reinforcing ribs may project substantially vertically up from the support plate. The reinforcing ribs, together with the support plate, delimit receiving pockets for receiving at least one battery cell unit of a traction battery for the purely electrical drive of the motor vehicle. The reinforcing ribs may be unitary with the support plate. The reinforcing ribs make it possible for the support plate and thus the underfloor unit to be sufficiently stable and stiff so to absorb and dissipate static and dynamic loads that occur during operation of the motor vehicle and to reinforce the support structure of the motor vehicle body with little use of material. The support plate can be a trough with reinforcing ribs projecting into the volume of the trough. The reinforcing ribs can extend in the longitudinal direction and transverse direction of the motor vehicle and thereby cross one another to form substantially rectangular receiving pockets. The reinforcing ribs are connected to laterally outer side walls of the support plate. The side walls can laterally delimit the volume defined by the trough. The battery cell units can be inserted into the receiving pockets from above. The reinforcing ribs of the support plate reinforce the underfloor unit and the motor vehicle body and receive and cool the battery cell units. Consequently, the reinforcing ribs perform plural functions simultaneously. In addition, the reinforcing ribs can dissipate heat from the battery cell units to the support plate, which can be cooled with the aid of the cooling medium guided through the cooling duct. Overheating of and damage to the battery cell units by non-dissipated heat can consequently be avoided.

The invention also relates to a traction battery for the purely electric drive of a motor vehicle. The traction battery comprises plural battery cell units inserted in a battery housing. The battery housing has a carrier plate that supports the battery cell units and is thermally coupled to the battery cell units. The carrier plate is designed as an underfloor unit that can be formed and developed as described above for reinforcing a motor vehicle body. The underfloor unit has a solidly designed base body of the underfloor unit. Hence, the underfloor unit can support the battery cells of the traction battery as a support plate of a battery housing, and protect them as an armor and actively and/or passively cool them with the aid of the cooling duct as a heat exchanger. As a result, a long service life of a traction battery in a lower region of the motor vehicle is made possible.

The invention also relates to a motor vehicle with a motor vehicle body having a supporting support structure and with a traction battery that can be formed and developed as described above. The traction battery is connected to the support structure on an underside of the motor vehicle body and reinforces the motor vehicle body. The underfloor unit of the traction battery has a solidly designed base body that can support the battery cells of the traction battery as a support plate, protect them as an armor and actively and/or passively cool them with the aid of the cooling duct as a heat exchanger. As a result, a long service life of a traction battery of the motor vehicle provided in a lower region of the motor vehicle is made possible.

The invention will be explained by way of example below with reference to the appended drawings and on the basis of preferred exemplary embodiments, wherein the features illustrated below may constitute an aspect of the invention both in each case individually and also in combination.

DETAILED DESCRIPTION

Figure 1:
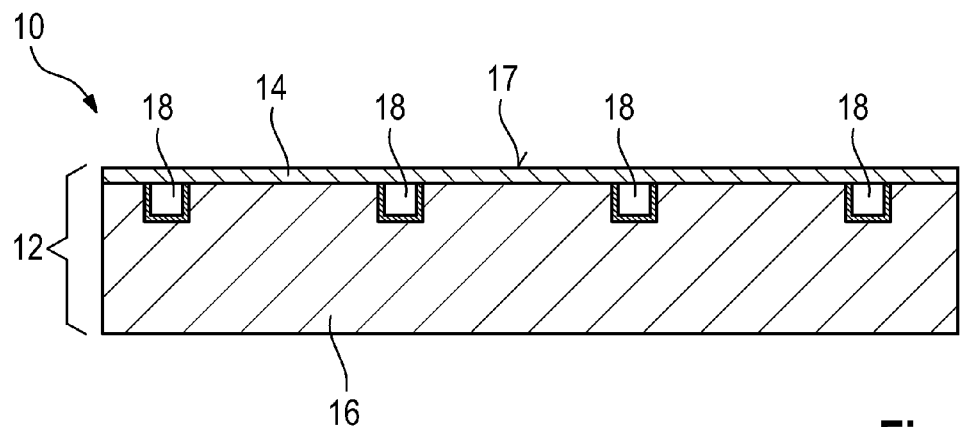
FIG. 1 is a schematic sectional view of a first embodiment of an underfloor unit.

An underfloor unit in accordance with a first embodiment of the invention is identified by the numeral 10 in FIG. 1. The underfloor unit 10 has a base body 12 with a support plate 14 and a solidly designed armor plate 16. The support plate 14 has an upper side 17 on which battery cell units of a traction battery can be placed and thermally contacted. Furthermore, reinforcing ribs can project substantially vertically up from the upper side 17. The battery cell units can be inserted from above into receiving depressions between the reinforcing ribs and the ribs can channel heat emitted by the battery cell units into the support plate 14. In the exemplary embodiment illustrated, cooling ducts 18 are milled into the armor plate 16 on its side directed toward the support plate 14. The cooling ducts 18 define open channels in the armor plate 16, and open sides of the cooling ducts 18 are closed by the support plate 14. The support plate 14 and the armor plate 16 delimit the flow cross section of the cooling ducts 18 and thereby form in each case part of the duct wall of the cooling ducts 18. The support plate 14 is connected fixedly in a sealed manner to the armor plate 16 by friction welding. As a result, a cooling medium flowing through the cooling ducts 18 cannot leak out of the cooling ducts 18.

Figure 2:
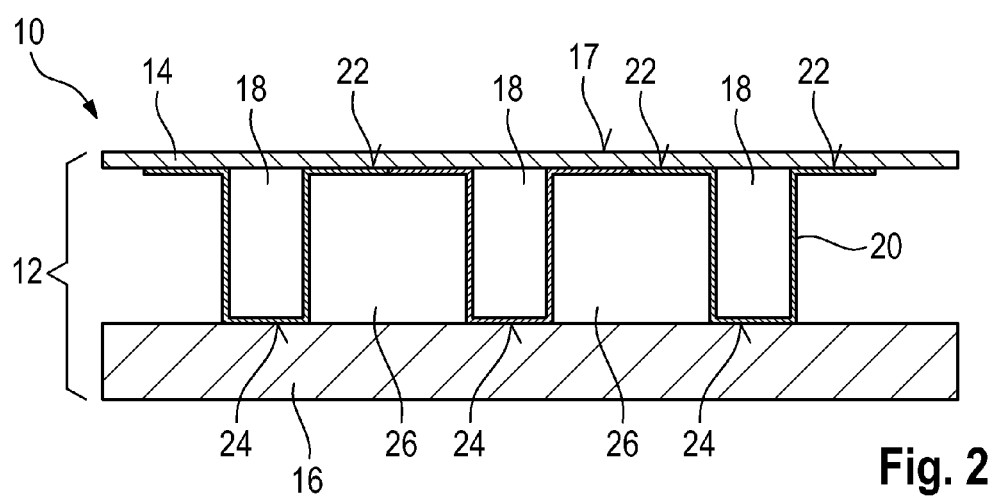
FIG. 2 is a schematic sectional view of a second embodiment of an underfloor unit.

In the embodiment of the underfloor unit 10 illustrated in FIG. 2, the support plate 14 is spaced apart from the armor plate 16 via a shaped sheet 20. The shaped sheet 20 is bent multiple times and forms the cooling duct 18 between the support plate 14 and the shaped sheet 20. The cooling duct has a substantially rectangular flow cross section, with the respective cooling ducts 18 spaced apart from one another. As a result, the shaped sheet 20 forms between the cooling ducts 18 in each case a planar upper contact surface 22 directed toward the support plate 14 and, in the region of the cooling ducts 18, a planar lower contact surface 24 directed toward the armor plate 16. The support plate 14 can be connected flat to the upper contact surface 22 and the armor plate can be connected flat to the lower contact surface 24. A cavity 26 is formed between the shaped sheet 20 and the armor plate 16 and forms an addition to or an alternative to the cooling duct 18 formed between the support plate 14 and the shaped sheet 20 for accommodating a flow of a cooling medium can flow.

What is claimed is:

1. An underfloor unit for reinforcing a motor vehicle body of a motor vehicle between a front axle and a rear axle, the underfloor unit including a base body that can be connected to the motor vehicle body for dissipating static and/or dynamic loads of the motor vehicle body, the base body comprising:
   a support plate having opposite upper and lower surfaces, the upper surface being configured for supporting battery cell units of a traction battery for purely electric drive of the motor vehicle;
   a shaped sheet having a substantially serpentine shape with a plurality of bends defining cooling channels for cooling the battery cell units, upper portions of the shaped sheet connected to the lower surface of the support plate; and
   an armor plate having opposite upper and lower surfaces, the upper surface of the armor plate being coupled to lower portions of the shaped sheet, the armor plate being configured for protecting the battery cell units against force from below.

2. The underfloor unit of claim 1, wherein the shaped sheet has an upper contact surface for planar contact with the support plate and a lower contact surface for planar contact with the armor plate.

3. The underfloor unit of claim 1, wherein the shaped sheet forms the cooling channels between the support plate and the shaped sheet and/or between the shaped sheet and the armor plate.

4. The underfloor unit of claim 1, wherein the support plate forms a duct wall of the cooling channels.

5. The underfloor unit of claim 1, wherein the support plate is welded to a material delimiting the cooling channels.

6. The underfloor unit of claim 1, wherein the support plate comprises a metal material, and the armor plate at least partially comprises a fiber-reinforced composite material.

7. An underfloor unit for reinforcing a motor vehicle body of a motor vehicle between a front axle and a rear axle, the underfloor unit including a base body that can be connected to the motor vehicle body for dissipating static and/or dynamic loads of the motor vehicle body, the base body comprising:
   a support plate having opposite upper and lower surfaces, the upper surface being configured for supporting battery cell units of a traction battery for purely electric drive of the motor vehicle are supported;
   an armor plate having opposite upper and lower surfaces, the upper surface of the armor plate being coupled to the lower surface of the support plate and configured for protecting the battery cell units against force from below; and
   a plurality of concave cooling channels for cooling the battery cell units formed in the upper surface of the armor plate and facing the lower surface of the support plate.

8. The underfloor unit of claim 7, wherein the support plate forms a duct wall of the cooling channels.

9. The underfloor unit of claim 7, wherein the support plate is welded to a material delimiting the cooling channels.

10. The underfloor unit of claim 7, wherein the support plate comprises a metal material, and the armor plate at least partially comprises a fiber-reinforced composite material.

* * * * *